US008570352B2

(12) United States Patent
Miyanagi et al.

(10) Patent No.: US 8,570,352 B2
(45) Date of Patent: Oct. 29, 2013

(54) SUPPRESSING UNSTABLE ELECTRICAL COUPLING BETWEEN A BOTTOM PLATE AND A CABLE BY PROVIDING A RECESS ON THE BOTTOM PLATE FOR ATTACHMENT OF THE CABLE

(75) Inventors: Hideto Miyanagi, Osaka (JP); Akizou Ohtani, Osaka (JP)

(73) Assignee: Kyocera Mita Corporation (JP)

( * ) Notice: Subject to any disclaimer, the term of this patent is extended or adjusted under 35 U.S.C. 154(b) by 51 days.

(21) Appl. No.: 13/430,788

(22) Filed: Mar. 27, 2012

(65) Prior Publication Data
US 2012/0250057 A1 Oct. 4, 2012

(30) Foreign Application Priority Data
Mar. 30, 2011 (JP) ................................. 2011-075657

(51) Int. Cl.
*B41J 2/385* (2006.01)
*H05K 5/02* (2006.01)
*B41J 29/13* (2006.01)

(52) U.S. Cl.
USPC .............................. 347/138; 347/108; 174/51

(58) Field of Classification Search
USPC ..................................... 174/51; 347/108, 138
See application file for complete search history.

(56) References Cited

U.S. PATENT DOCUMENTS

| | | | | |
|---|---|---|---|---|
| 4,926,219 A | * | 5/1990 | Hirasawa et al. | ................ 399/90 |
| 6,198,631 B1 | * | 3/2001 | Radosavljevic et al. | ...... 361/704 |
| 2003/0197900 A1 | | 10/2003 | Hiromatsu | |

FOREIGN PATENT DOCUMENTS

JP 2003-315929 11/2003

* cited by examiner

*Primary Examiner* — Eric A Rust
(74) *Attorney, Agent, or Firm* — Gerald E. Hespos; Michael J. Porco; Matthew T. Hespos

(57) ABSTRACT

An optical reading device includes a housing, a document platen member, a scanning unit, a cable and an insulating sheet. The cable includes a first end which is fixed to the scanning unit, a second end which is fixed to the bottom plate and an intermediate portion which is held in surface contact with the bottom plate and curved and deformed according to a reciprocal movement of the scanning unit. The insulating sheet is interposed between the bottom plate and the intermediate portion of the cable. The housing includes a recess formed in the bottom plate. The insulating sheet covers an opening of the recess, the upper surface thereof is in contact with the intermediate portion of the cable and a space is formed between the lower surface of the insulating sheet and the bottom surface of the recess.

10 Claims, 6 Drawing Sheets

SUPPRESSING UNSTABLE ELECTRICAL COUPLING BETWEEN A BOTTOM PLATE AND A CABLE BY PROVIDING A RECESS ON THE BOTTOM PLATE FOR ATTACHMENT OF THE CABLE

This application is based on Japanese Patent Application Serial No. 2011-075657 filed with the Japan Patent Office on Mar. 30, 2011, the contents of which are hereby incorporated by reference.

BACKGROUND

The present disclosure relates to an optical reading device for optically reading a document image and an image forming apparatus for forming an image on a sheet based on the document image.

An image forming apparatus for forming a copied image of a document image on a sheet includes an optical reading device for optically reading the document image. The optical reading device includes a scanning unit equipped with a light source for irradiating light for optical reading to a document placed on a document platen glass, a cable (flat cable), one end of which is connected to the scanning unit, and a housing for housing these. The scanning unit emits light toward the document platen glass while reciprocating along a predetermined scanning direction in the housing. An intermediate portion of the flat cable is curved and deformed as the scanning unit reciprocates.

The above housing is normally made of a frame structure of a sheet metal. The intermediate portion of the flat cable is in surface contact with the bottom plate of the housing, but the insulating coating of the flat cable is generally thin and electrical coupling (electrostatic coupling or electromagnetic coupling) may be formed between conductors of the flat cable and the bottom plate of the housing. In this case, if a contact state of the flat cable with the bottom plate changes due to a reciprocal movement of the scanning unit, a state of the electrical coupling becomes unstable. This causes the production of electromagnetic noise which affects the operation of the optical reading device or the image forming apparatus. To solve this problem, an insulating member is laid in an area where the flat cable is in surface contact with the bottom plate in a conventional technology.

However, in the conventional technology, the insulating member is interposed between the bottom plate of the housing and the flat cable and the electrical coupling is suppressed by the thickness of the insulating member. Accordingly, it is necessary to use a member with a considerable thickness or devise the shape of the insulating member, which causes a cost increase.

An object of the present disclosure is to provide an optical reading device and an image forming apparatus capable of simply suppressing unstable electrical coupling between a bottom plate of a housing and a cable.

SUMMARY

One aspect of the present disclosure is directed to an optical reading device, including a housing made of metal, including a bottom plate and having an open upper surface; a document platen member mounted in an opening of the housing; a scanning unit; a cable; and an insulating sheet. The scanning unit has a light source mounted therein and emits light toward the document platen member while reciprocating along a predetermined scanning direction between the bottom plate and the document platen member. The cable includes a first end which is fixed to the scanning unit, a second end which is fixed to the bottom plate and an intermediate portion which is held in surface contact with the bottom plate and curved and deformed according to a reciprocal movement of the scanning unit. The insulating sheet is interposed between the bottom plate and the intermediate portion of the cable. The housing includes a recess formed in the bottom plate, having an open upper side and extending in the scanning direction. The insulating sheet covers an opening of the recess, the upper surface thereof is in contact with the intermediate portion of the cable and a space is formed between the lower surface of the insulating sheet and the bottom surface of the recess.

Another aspect of the present disclosure is directed to an image forming apparatus, including an optical reading device for optically reading a document image and an image forming unit for forming an image on a sheet based on the document image, wherein the optical reading device has the above construction.

These and other objects, features and advantages of the present disclosure will become more apparent upon reading the following detailed description along with the accompanying drawings.

DETAILED DESCRIPTION

Figure 1:
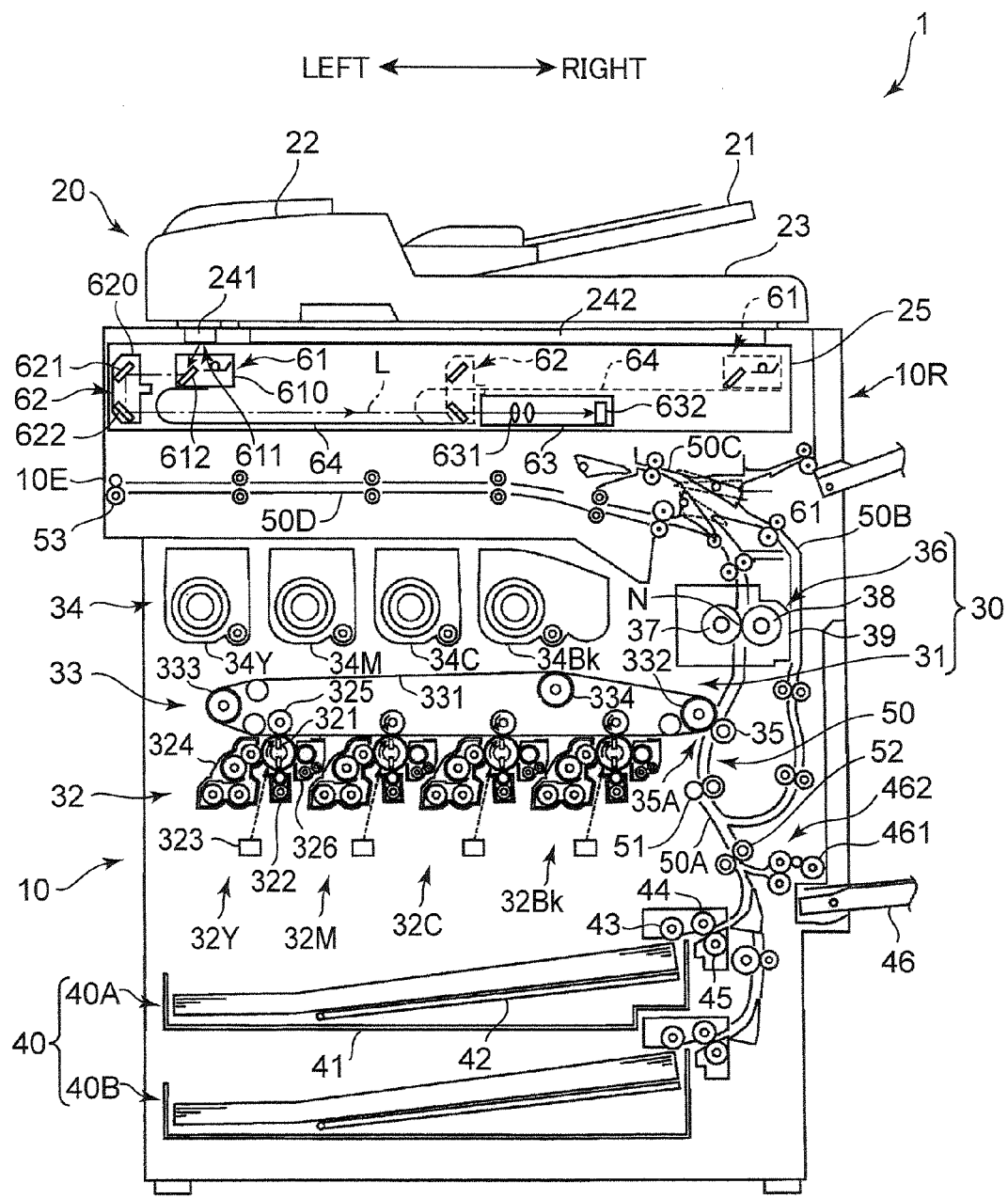
FIG. 1 is a sectional view showing the internal structure of an image forming apparatus according to one embodiment of the present disclosure.

Hereinafter, an embodiment of the present disclosure is described based on the drawings. FIG. 1 is a sectional view showing the internal structure of an image forming apparatus 1 according to one embodiment of the present disclosure. Although a copier is illustrated as the image forming apparatus 1 here, the image forming apparatus may be a printer, a facsimile machine or a complex machine provided with these functions.

The image forming apparatus 1 includes an apparatus main body 10 having a substantially rectangular parallelepipedic housing structure and an automatic document feeder 20 arranged atop the apparatus main body 10. A reading unit 25 (optical reading device) for optically reading a document image to be copied, an image forming station 30 for performing an image forming process on a sheet, a feeding unit 40 for storing sheets to be conveyed to the image forming station 30, and a conveyance path 50 for conveying a sheet from the feeding unit 40 to a sheet ejection port 10E via the image forming station 30 are housed in the apparatus main body 10.

The automatic document feeder 20 is rotatably mounted on the upper surface of the apparatus main body 10. The automatic document feeder 20 automatically feeds a document sheet to be copied toward a predetermined document reading position (position where a first contact glass 241 is mounted) in the apparatus main body 10. On the other hand, when a user manually places a document sheet at a predetermined document reading position (arrangement position of a second contact glass 242), the automatic document feeder 20 is opened upward. The automatic document feeder 20 includes a document tray 21 on which a document sheet is to be placed, a document conveying unit 22 for conveying a document sheet via an automatic document reading position and a document ejection tray 23 to which a document sheet after reading is to be ejected.

The reading unit 25 optically reads an image of a document sheet through the first contact glass 241 used to read a document sheet automatically fed from the automatic document feeder 20 on the upper surface of the apparatus main body 10 or the second contact glass 242 (document platen member) used to read a manually placed document sheet. A scanning unit 61 which reciprocates in a lateral direction, a mirror unit 62 which reciprocates a distance, which is half the moving distance of the scanning unit 61, in the lateral direction, a photoelectric conversion module 63 which outputs analog image data of a document sheet, and a flat cable 64 (cable) which supplies power to the scanning unit 61 are provided in the reading unit 25.

The scanning unit 61 includes a first moving frame 610, a plurality of LED (Light Emitting Diode) light sources 611 mounted in the first moving frame 610 and a first mirror 612. The first moving frame 610 is moved in the lateral direction by guide rails and a moving mechanism (not shown) provided in the reading unit 25. The LED light sources 611 emit light to optically read a document sheet image toward an automatically fed document sheet passing on the first contact glass 241 or a document sheet manually placed on the second contact glass 242. The first mirror 612 reflects reflected light L of the light emitted toward the document sheet by the LED light sources 611 toward the mirror unit 62.

The mirror unit 62 includes a second moving frame 620, and a second mirror 621 and a third mirror 622 which are mounted in this second moving frame 620. The second moving frame 620 is moved in the lateral direction, following the first moving frame 610, by the guide rails and a moving mechanism (not shown) provided in the reading unit 25. The second mirror 621 and the third mirror 622 are respectively so mounted in the second moving frame 620 that the second mirror 621 is located substantially at the same height as the first mirror 612 and the third mirror 622 is located below the second mirror 621. The second mirror 621 reflects the reflected light L reflected by the first mirror 612 toward the third mirror 622. The third mirror 622 reflects the reflected light L toward the photoelectric conversion module 63.

The photoelectric conversion module 63 generates analog image data of the document sheet image by photoelectrically converting the reflected light L and includes a lens unit 631 and an imaging element 632. The lens unit 631 images the reflected light L reflected by the third mirror 622 on an imaging surface of the imaging element 632. The imaging element 632 is composed of a CCD (Charge Coupled Device) or the like and photoelectrically converts the reflected light L into an analog electrical signal. This analog electrical signal is converted into a digital electrical signal by an A/D conversion circuit (not shown) and fed as image data to exposure devices 323 to be described later.

Figure 2:
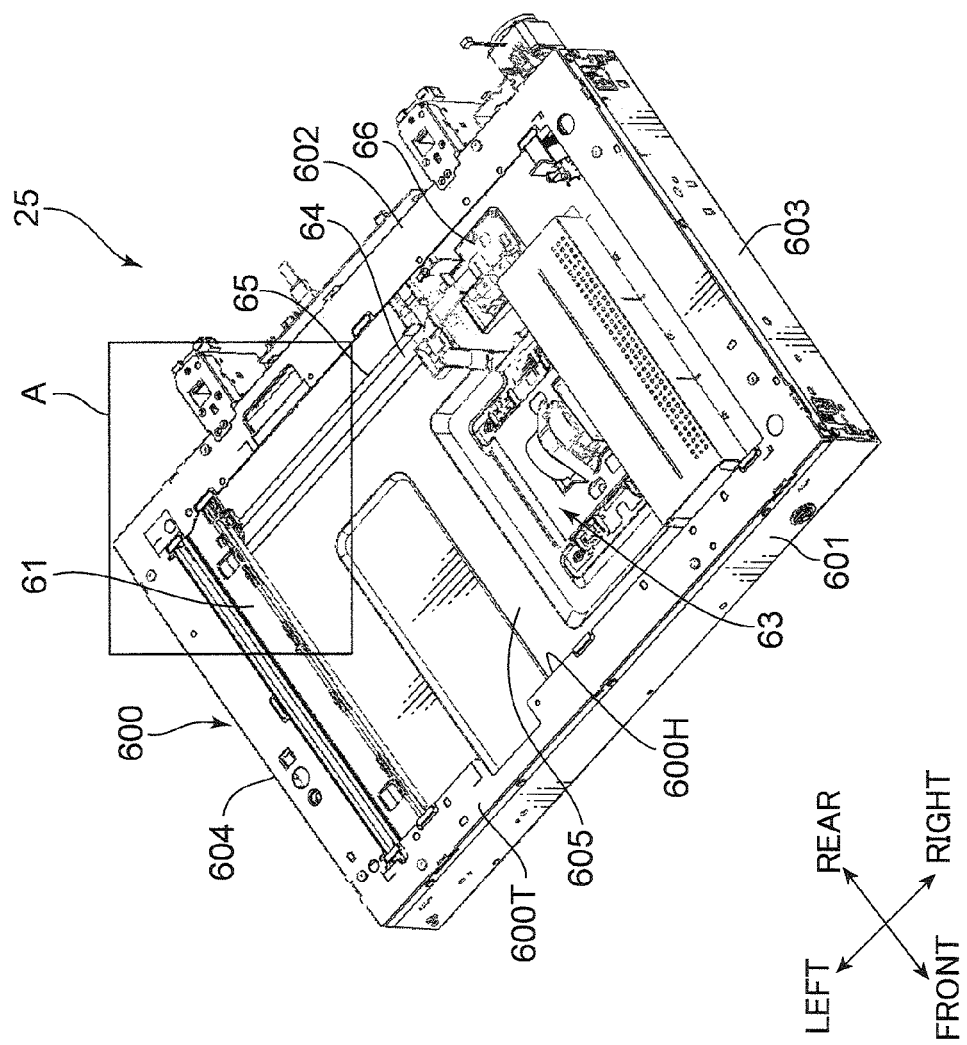
FIG. 2 is a perspective view showing the external appearance of a reading unit (optical reading device)

The flat cable 64 is composed of a plurality of metal conductors arranged side by side in a row and a common insulating coating layer covering these conductors, and has upper and lower flat surfaces and the opposite end portions thereof. One end (first end) of the flat cable 64 is fixed to the scanning unit 61, and the other end (second end) is fixed to a bottom plate 605 of a housing 600 of the reading unit 25 (FIG. 2).

Further, an intermediate portion of the flat cable 64 is curved in a U shape in a side view. The construction of this flat cable 64 is described in detail later.

The first moving frame 610 (scanning unit 61) moves to a position right below the first contact glass 241 and stands still in an automatic feeding mode in which a document sheet is automatically fed from the automatic document feeder 20. Further, the second moving frame 620 (mirror unit 62) moves to the leftmost position in the reading unit 25 and stands still. In such a state, light is emitted toward a document sheet from the LED light sources 611.

On the other hand, in a mode in which a document sheet is manually placed on the second contact glass 242, the first moving frame 610 moves to the right (scanning direction) according to the size of the document sheet from a position right below the left end of the second contact glass 242. During this movement, light is emitted toward the document sheet from the LED light sources 611. The second moving frame 620 moves a distance, which is half the moving distance of the first moving frame 610, to the right, following the first moving frame 610. Note that a state where the scanning unit 61 and the mirror unit 62 are moved to their rightmost positions is shown by dotted line as a state in this manually placing mode in FIG. 1. At this time, the flat cable 64 moves, following the scanning unit 61, while the position of curvature deformation thereof is changed according to the movement of the scanning unit 61.

The image forming station 30 includes an image forming device 31 for forming a toner image and transferring it to a sheet, and a fixing device 36 for fixing the toner image to the sheet. The image forming device 31 includes an image forming unit 32 with four units 32Y, 32M, 32C and 32Bk for forming toner images of yellow (Y), magenta (M), cyan (C) and black (Bk) to form a full color toner image, an intermediate transfer unit 33 arranged above and adjacent to the image forming unit 32 and a toner supplying unit 34 arranged above the intermediate transfer unit 33.

Each of the image forming units 32Y, 32M, 32C and 32Bk includes a photoconductive drum 321, and a charger 322, an exposure device 323, a developing device 324, a primary transfer roller 325 and a cleaner 326 arranged around the photoconductive drum 321.

The photoconductive drum 321 rotates about its shaft and has an electrostatic latent image and a toner image formed on its circumference surface. A photoconductive drum made of an amorphous silicon (a-Si) material can be used as the photoconductive drum 321. The charger 322 uniformly charges the circumferential surface of the photoconductive drum 321. The exposure device 323 includes a laser light source and optical devices such as mirrors and lenses and forms an electrostatic latent image by irradiating the circumferential surface of the photoconductive drum 321 with light modulated based on digital image data of a document sheet image fed from the photoelectric conversion module 63.

The developing device 324 supplies toner to the circumferential surface of the photoconductive drum 321 to develop an electrostatic latent image formed on the photoconductive drum 321. The developing device 324 is for two-component developer and includes agitating rollers, a magnetic roller and a developing roller. The agitating rollers convey the two-component developer in a circulating manner while agitating it, thereby charging the toner. A two-component developer layer is carried on the circumferential surface of the magnetic roller, and a toner layer formed by the transfer of the toner due to a potential difference between the magnetic roller and the developing roller is carried on the circumferential surface of the developing roller. The toner on the developing roller is supplied to the circumferential surface of the photoconductive drum 321 to develop the electrostatic latent image.

The primary transfer roller 325 forms a nip portion together with the photoconductive drum 321 with an intermediate transfer belt 331 provided in the intermediate transfer unit 33 sandwiched therebetween, and primarily transfers a toner image on the photoconductive drum 321 to the intermediate transfer belt 331. The cleaner 326 includes a cleaning roller and the like and cleans the circumferential surface of the photoconductive drum 321 after the transfer of the toner image.

The intermediate transfer unit 33 includes the intermediate transfer belt 331, a drive roller 332, a driven roller 333 and a tension roller 334. The intermediate transfer belt 331 is an endless belt mounted on these rollers 323, 333 and 334 and toner images from a plurality of photoconductive drums 321 are superimposed on the outer circumferential surface of the intermediate transfer belt 331 (primary transfer). The drive roller 332 is a roller to which a drive force to rotate the intermediate transfer belt 331 is given, and a secondary transfer roller 35 is arranged to face the circumferential surface of the drive roller 332. A nip portion between the drive roller 332 and the secondary transfer roller 35 serves as a secondary transfer unit 35A for transferring a full color toner image superimposed on the intermediate transfer belt 331 to a sheet. Note that the driven roller 333 is a roller driven as the intermediate transfer belt 331 rotates and the tension roller 334 is a roller which gives a predetermined tension to the intermediate transfer belt 331.

The toner supply unit 34 includes a toner container 34Y for yellow, a toner container 34M for magenta, a toner container 34C for cyan and a toner container 34Bk for black. These toner containers 34Y, 34C, 34M and 34Bk are respectively for storing the toners of the respective colors, and supply the toners of the respective colors to the developing devices 324 of the image forming units 32Y, 32M, 32C and 32Bk corresponding to the respective colors Y, M, C and Bk via unillustrated supply paths.

The fixing device 36 performs a fixing process of fixing a secondarily transferred toner image to a sheet. The fixing device 36 includes a heating roller 37, a pressure roller 38 arranged to face in parallel to the heating roller 37, and a main housing 39 for housing the heating roller 37 and the pressure roller 38. The heating roller 37 includes an electric heating element inside. The pressure roller 38 is pressed in contact with the heating roller 37 and a fixing nip portion N is formed between the pressure roller 38 and the heating roller 37. When a sheet after secondary transfer passes the fixing nip portion N, a toner image is fixed to the sheet by being heated by the heating roller 37 and pressed by the pressure roller 38.

The feeding unit 40 includes two sheet cassettes 40A, 40B arranged one above the other for storing sheets to which the image forming process is to be performed. These sheet cassettes 40A, 40B can be withdrawn forward from the front side of the lower housing 10. These cassettes 40A, 40B are cassettes for automatic feeding, and a sheet tray 46 for manual feeding is provided on the right surface of the apparatus main body 10. The sheet tray 46 has a lower end portion thereof openably and closably attached to the apparatus main body 10. In the case of manual sheet feeding, the user opens the sheet tray 46 as shown and places a sheet thereon.

The sheet cassette 40A (40B) includes a sheet storing portion 41 for storing a sheet stack composed of a plurality of sheets stacked one on another, and a lift plate 42 which is lifted up to feed the sheets. A pickup roller 43 and a pair of a feed roller 44 and a retard roller 45 are arranged above the right end of the sheet cassette 40A (40B). The uppermost sheet of the sheet stack in the sheet cassette 40A is picked up one by one and conveyed into the upstream end of the conveyance path 50 by driving the pickup roller 43 and the feed roller 44. A sheet placed on the sheet tray 46 is conveyed into the conveyance path 50 similarly by driving a pickup roller 461 and a feed roller 462.

The conveyance path 50 includes a main conveyance path 50A for conveying a sheet from the feeding unit 40 to the exit of the fixing device 36 via the image forming device 31, a reversing conveyance path 50B for returning a sheet having one side printed to the image forming device 31 in the case of printing both sides of the sheet, a switchback conveyance path 50C for conveying a sheet from the downstream end of the main conveyance path 50 to the upstream end of the reversing conveyance path 50B, and a horizontal conveyance path 50D for conveying a sheet in a horizontal direction from the downstream end of the main conveyance path 50A to the sheet ejection port 10E provided in the left surface of the apparatus main body 10.

A pair of registration rollers 51 are arranged at a side of the main conveyance path 50A upstream of the secondary transfer unit 35A. A sheet is temporarily stopped by the pair of registration rollers 51 and fed to the secondary transfer unit 35A at a predetermined timing for image transfer after a skew correction. Besides, a plurality of conveyor rollers for conveying a sheet are arranged in the main conveyance path 50A. The same holds for the other conveyance paths 50B, 50C and 50D.

A ejection roller 53 is arranged at the most downstream end of the conveyance path 50. The ejection roller 53 feeds a sheet to an unillustrated post-processing apparatus arranged on the left surface of the apparatus main body 10 through the sheet ejection port 10E. Note that a sheet ejection tray is provided below the sheet ejection port 10E in the image forming apparatus to which the post-processing apparatus is not attached.

Figure 3:
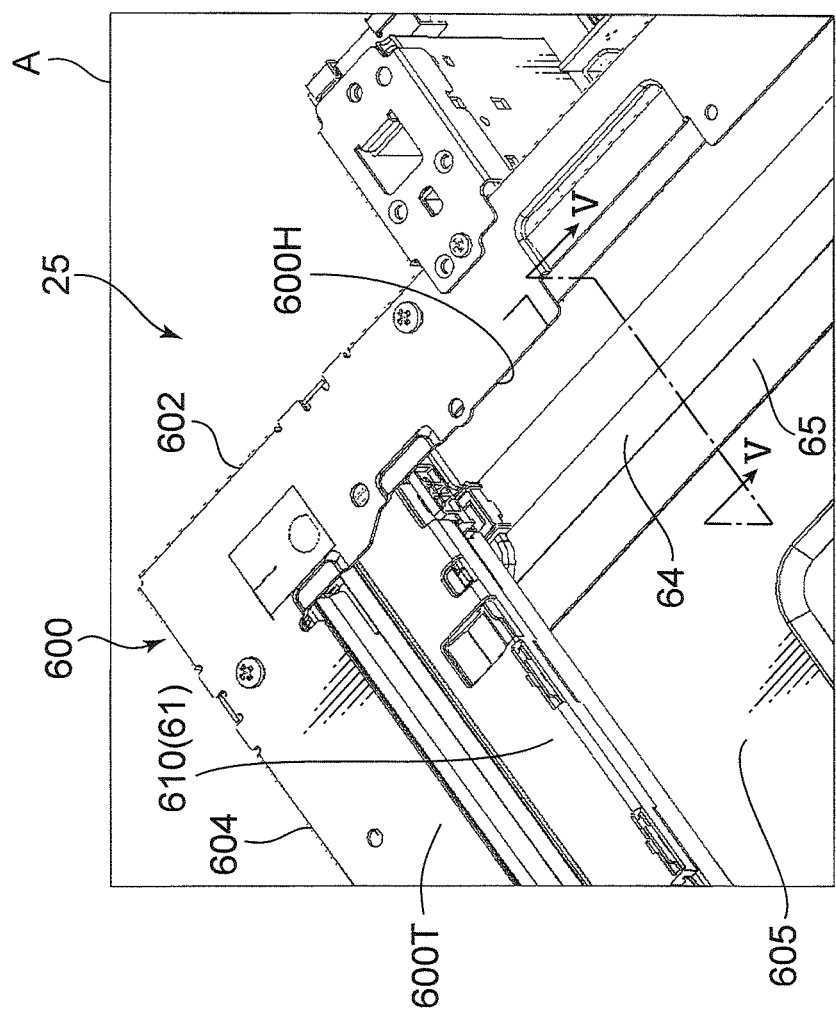
FIG. 3 is an enlarged view of a part A of FIG. 2.
Figure 4:
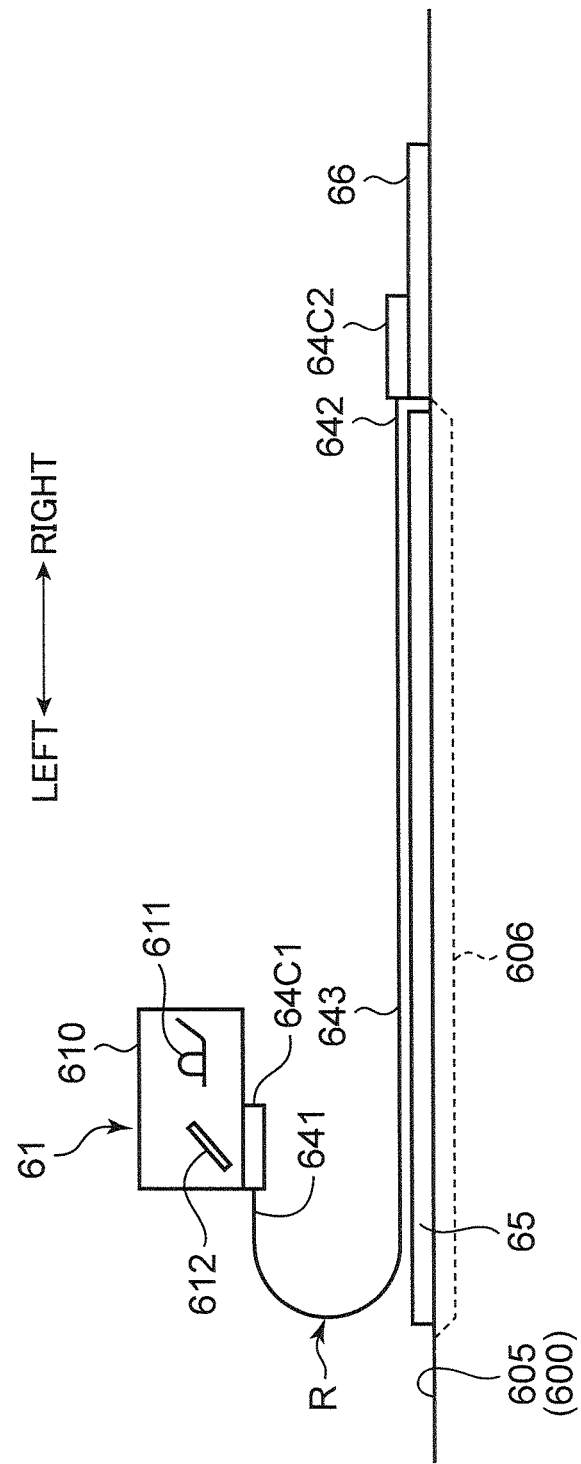
FIG. 4 is a side view of a scanning unit and a flat cable.
Figure 5:
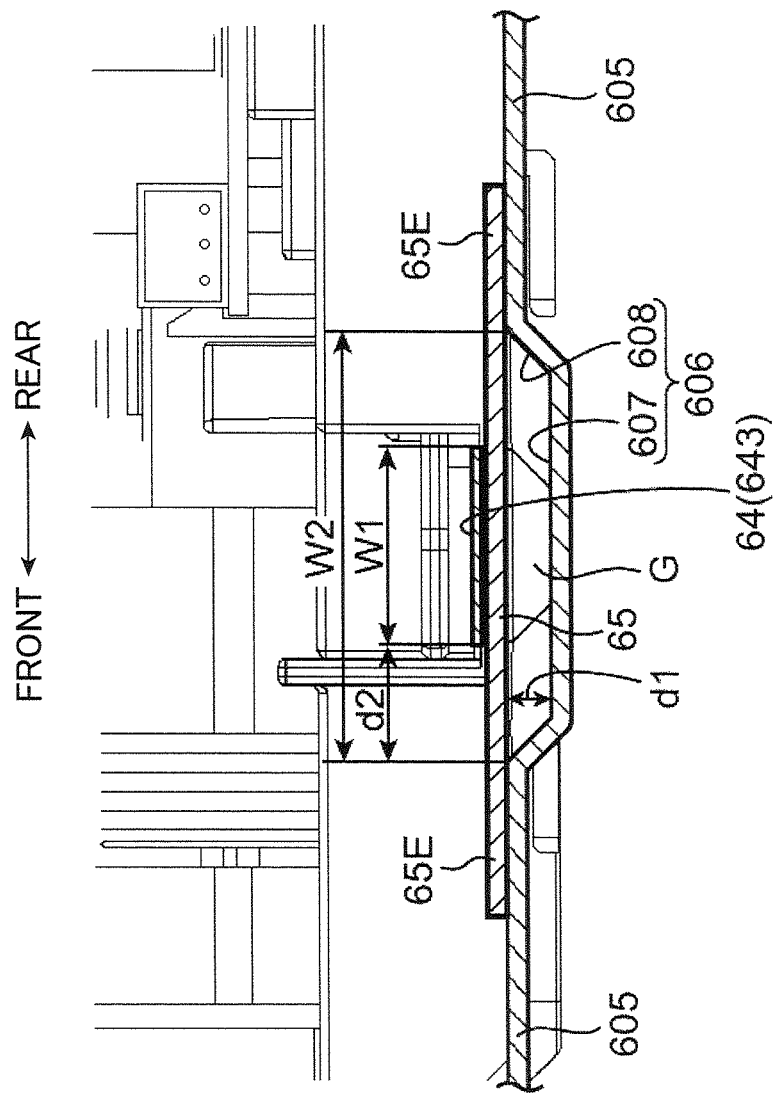
FIG. 5 is a sectional view along V-V of FIG. 3.

The reading unit 25 of the image forming apparatus 1 constructed as described above further includes a construction devised to deal with electrical noise of the flat cable 64 in this embodiment. This point is described below with reference to FIGS. 2 to 5. FIG. 2 is a perspective view showing the external appearance of the reading unit 25, FIG. 3 is an enlarged view of a part A of FIG. 2, FIG. 4 is a side view of the scanning unit 61 and the flat cable 64, and FIG. 5 is a sectional view along V-V of FIG. 3.

The reading unit 25 includes the housing 600 made of metal. The housing 600 is an assembly of a metal plate frame member and includes a front plate 601, a rear plate 602, a right plate 603 and a left plate 604 which form a rectangular frame body long in the lateral direction, a bottom plate 605 in the form of a flat plate assembled at the bottom side of this frame body, and a ceiling plate 600T assembled at the upper side of the frame body. The ceiling plate 600T is a frame formed with an opening 600H in which the second contact glass 242 (document platen member) is mounted. The housing 600 is open upward through this opening 600H.

The aforementioned scanning unit 61, mirror unit 62, photoelectric conversion module 63 and flat cable 64 are housed in this housing 600. A pair of guide rails (not shown) are provided at the inner sides of the front plate 601 and the rear plate 602. The first moving frame 610 of the scanning unit 61 and the second moving frame 620 of the mirror unit 62 are mounted between the pair of guide rails and reciprocate in the lateral direction (scanning direction).

One end of the flat cable 64 is fixed near the rear end of the first moving frame 610 and the other end side thereof extends to the right in parallel to the rear plate 602. The other end of the flat cable 64 is connected to a circuit board 66 mounted on a surface of the bottom plate 605. The lower flat surface of the flat cable 64 is in surface contact with the upper surface of the bottom plate 605. An insulating sheet 65 is interposed between the lower flat surface of the flat cable 64 and the bottom plate 605.

With reference to FIGS. 4 and 5, the above construction is described in detail. A first connector 64C1 is mounted on a first end 641 (the above one end) of the flat cable 64 and connected to a mating connector provided on the lower surface of the first moving frame 610. A second connector 64C2 is mounted on a second end 642 (the above other end) of the flat cable 64, and connected to a mating connector provided on the circuit board 66.

An intermediate portion 643 of the flat cable 64 is a part which is curved and deformed according to a reciprocal movement of the scanning unit 61. A curving and deforming part of the intermediate portion 643 is shown by R in FIG. 4. A part of the intermediate portion 643 closer to the second end 642 than the curving and deforming portion R is a part in surface contact with the bottom plate 605. Note that the position of the scanning unit shown in FIG. 4 is a stationary position (position shown by solid line in FIG. 1) in the above automatic feeding mode where the length of a surface contact part (surface contact area) of the intermediate portion 643 is largest.

The insulating sheet 65 is a resin strip-like sheet made of a PET film and the like, and the width thereof in forward and backward directions is about three to four times as long as that of the flat surfaces of the flat cable 64. This insulating sheet 65 includes adhesive layers (not shown) on the lower surfaces of widthwise end portions 65E, 65E thereof, and is so attached to the bottom plate 605 as to cover an upper opening of a recess 606 formed in the bottom plate 605.

The recess 606 is a shallow groove formed such as by drawing and extending in the lateral direction in parallel to the rear plate 602 and includes a flat bottom portion 607 and a pair of inclined portions 608 extending obliquely upward from the front and rear ends (side edges) of the bottom portion 607 (FIG. 5). A width W2 of the recess 606 in forward and backward directions is longer than a width W1 of the flat surfaces of the flat cable 64 and shorter than the width of the insulating sheet 65 in forward and backward directions. Thus, the opening of the recess 606 is completely covered by the insulating sheet 65 and a space G is formed between the lower surface of the insulating sheet 65 and the bottom portion 607.

The lower surface of the intermediate portion 643 of the flat cable 64 is in contact with a central part of the upper surface of the insulating sheet 65 in forward and backward directions. Thus, the flat cable 64 is facing the bottom plate 605 while being spaced from the bottom plate 605 made of metal by the space G in addition to by the thickness of the insulating sheet 65. Accordingly, even in the case of using a thin general-purpose insulating film as the insulating sheet 65, the flat cable can be sufficiently spaced from the bottom plate 605 made of metal. This can suppress the electrical coupling between the flat cable 64 and the bottom plate 605 (housing 600), i.e. electromagnetic waves, which are radiated as a result of power application to the flat cable 64, are received by the housing 600.

This leads to the prevention of the intrusion of electromagnetic noise radiated by the flat cable 64 into the apparatus main body 10 via the housing 600. This further leads to a reduction in the level of radiation noise radiated from the apparatus main body 10. Particularly, the insulating coating of the flat cable 64 is thin, electrical coupling tends to occur between the flat cable 64 and the bottom plate 605 and a state of this electrical coupling (antenna length, coupling energy, etc.) tends to vary due to a movement of the flat cable 64. However, the occurrence of unstable electrical coupling can be prevented by taking an anti-noise measure of this embodiment. On the other hand, the insulating sheet 65 only has to be a sheet which simply covers the opening of the recess 606. Thus, there is an advantage that the anti-noise measure brings neither the complication of the structure nor a cost increase.

A distance d1 between the lower surface of the insulating sheet 65 and the bottom portion 607 of the recess 606, i.e. the height of the space G is preferably 1 mm or longer, particularly 2 mm or longer. Further, a distance d2 between the lateral end edge of the flat cable 64 and the opening edge of the recess 606 is also preferably 1 mm or longer, particularly 2 mm or longer. If the distances d1, d2 are at least in these ranges, electrical coupling between the flat cable 64 and the bottom plate 605 can be sufficiently suppressed.

Although the image forming apparatus 1 according to the embodiment of the present disclosure has been described above, the present disclosure is not limited to this and can be, for example, modified as follows.

(1) In the above embodiment, the flat cable 64 is illustrated as an example of the cable. The cable needs not be a flat cable having flat surfaces and may be, for example, a bundle cable formed by bundling a plurality of insulated strands into a cylindrical shape.

(2) In the above embodiment, the space G equivalent to the depth of the recess 606 is formed between the lower surface of the insulating sheet 65 and the bottom portion 607. A spacer may be arranged in this space G if necessary. For example, a plate member made of styrene foam and having a thickness equivalent to the above distance d1 can be used as this spacer.

(3) In the above embodiment, the recess 606 including the flat bottom portion 607 and the pair of inclined portions 608 is illustrated as a recess. Instead, the recess 606 may be deeper in a part right below the flat cable 64, for example, by curving the bottom portion 607 downwardly in a cross section along forward and backward directions or forming the bottom portion 607 into a two-level configuration.

Figure 6:
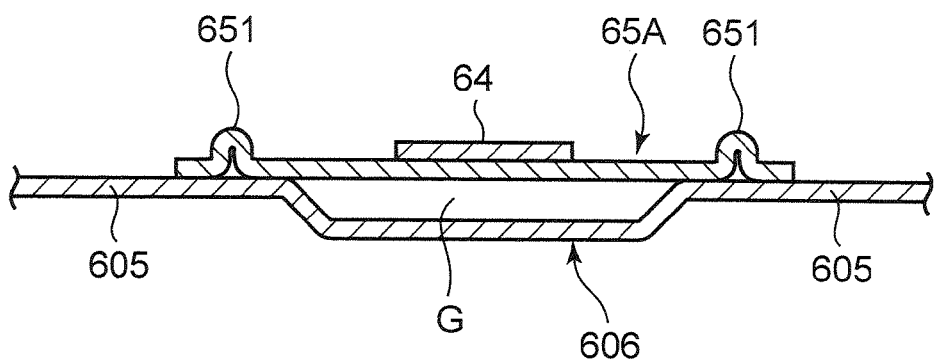
FIG. 6 is a sectional view showing a modification of an insulating sheet.
Figure 7:
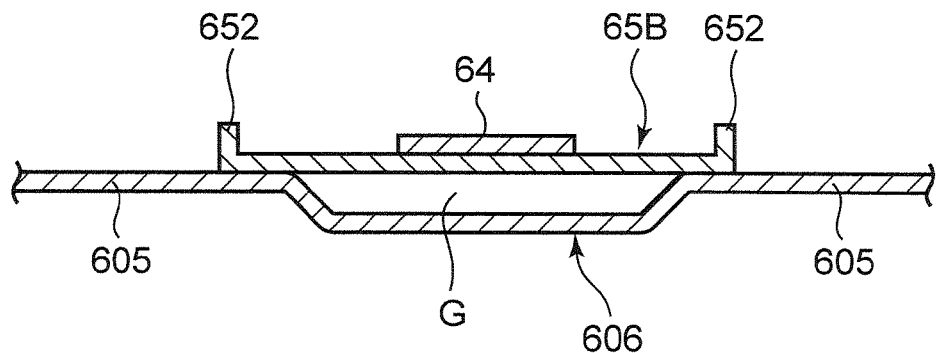
FIG. 7 is a sectional view showing another modification of the insulating sheet.

(4) In the above embodiment, the insulating sheet 65 is a flat sheet. Instead, the insulating sheet 65 may have a guiding function of guiding the end edges of the flat cable 64. FIGS. 6 and 7 are sectional views showing modifications of the insulating sheet.

An insulating sheet 65A shown in FIG. 6 includes elongated projections 651 (guide portions) near the opposite widthwise ends thereof. The elongated projections 651 are formed by curving parts of the insulating sheet 65A upward such that the curved parts have a small diameter. The end edges of the flat cable 64 come into contact with the elongated projections 651 when the flat cable 64 pivots in a direction perpendicular to the scanning direction while moving, following a reciprocal movement of the scanning unit 61.

An insulating sheet 65B shown in FIG. 7 includes bent portions 652 (guide portions) bent upward at the opposite widthwise ends thereof. The end edges of the flat cable 64 come into contact with these bent portions 652, whereby the flat cable 64 is guided. The shape of the guide portions is not limited to this and the guide portions only have to be upwardly projecting parts. For example, ribs may be provided on the bottom plate 605 near the recess 606 and the guide portions may be formed by attaching the insulating sheet 65 to cross over these ribs.

(5) In the above embodiment, the reading unit 25 incorporated into the image forming apparatus 1 is illustrated as the optical reading device. The optical reading device may be a stand-alone scanner device or the like.

As described above, according to the present disclosure, unstable electrical coupling between the bottom plate 605 of the housing 600 and the flat cable 64 can be suppressed by a simple construction composed of the recess 606 formed in the bottom plate 605 and the insulating sheet 65 covering the opening of the recess 606. Thus, the influence of noise resulting from a movement of the flat cable 64 (cable) provided in the optical reading device can be suppressed without leading to a cost increase and the complication of the construction.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An optical reading device, comprising:
    a housing made of metal, including a bottom plate and having an open upper surface;
    a document platen member mounted in an opening of the housing;
    a scanning unit in which a light source is mounted and which emits light toward the document platen member while reciprocating along a predetermined scanning direction between the bottom plate and the document platen member;
    a cable including a first end which is fixed to the scanning unit, a second end which is fixed to the bottom plate and an intermediate portion which is held in surface contact with the bottom plate and curved according to a reciprocal movement of the scanning unit; and
    an insulating sheet interposed between the bottom plate and the intermediate portion of the cable; wherein:
    the housing includes a recess formed in the bottom plate and extending in the scanning direction, the recess being a shallow groove having an open upper side, a flat bottom surface and a pair of inclined portions extending obliquely up from side edges of the bottom surface; and
    the insulating sheet covers an opening of the recess, the upper surface thereof is in contact with the intermediate portion of the cable and a space is formed between the lower surface of the insulating sheet and the bottom surface of the recess.

2. An optical reading device according to claim 1, wherein:
    the cable is a flat cable and a flat surface thereof is in contact with the insulating sheet; and
    the opening of the recess is wider than the width of the flat surface of the flat cable.

3. An optical reading device according to claim 1, wherein:
    a distance between the lower surface of the insulating sheet and the bottom surface of the recess is 1 mm or longer.

4. An optical reading device according to claim 1, wherein:
    a distance between the lower surface of the insulating sheet and the bottom surface of the recess is 1 mm or longer; and
    a distance between the side edge of the flat cable and the opening edge of the recess is 1 mm or longer.

5. An optical reading device according to claim 1, wherein:
    the insulating sheet includes a guide portion for guiding the cable.

6. An image forming apparatus, comprising:
    an optical reading device for optically reading a document image; and
    an image forming unit for forming an image on a sheet based on the document image; wherein the optical reading device includes:
    a housing made of metal, including a bottom plate and having an open upper surface;
    a document platen member mounted in an opening of the housing;
    a scanning unit in which a light source is mounted and which emits light toward the document platen member while reciprocating along a predetermined scanning direction between the bottom plate and the document platen member;
    a cable including a first end which is fixed to the scanning unit, a second end which is fixed to the bottom plate and an intermediate portion which is held in surface contact with the bottom plate and curved and deformed according to a reciprocal movement of the scanning unit; and
    an insulating sheet interposed between the bottom plate and the intermediate portion of the cable; wherein:
    the housing includes a recess formed in the bottom plate and extending in the scanning direction, the recess being a shallow groove having an open upper side, a flat bottom surface and a pair of inclined portions extending obliquely up from side edges of the bottom surface; and
    the insulating sheet covers an opening of the recess, the upper surface thereof is in contact with the intermediate portion of the cable and a space is formed between the lower surface of the insulating sheet and the bottom surface of the recess.

7. An image forming apparatus according to claim 6, wherein:
    the cable is a flat cable and a flat surface thereof is in contact with the insulating sheet; and
    the opening of the recess is wider than the width of the flat surface of the flat cable.

8. An image forming apparatus according to claim 6, wherein:
    a distance between the lower surface of the insulating sheet and the bottom surface of the recess is 1 mm or longer.

9. An image forming apparatus according to claim 6, wherein:
    a distance between the lower surface of the insulating sheet and the bottom surface of the recess is 1 mm or longer; and
    a distance between the side edge of the flat cable and the opening edge of the recess is 1 mm or longer.

10. An image forming apparatus according to claim 6, wherein:
    the insulating sheet includes a guide portion for guiding the cable.

* * * * *